United States Patent [19]
Iinuma et al.

[11] Patent Number: 5,785,654
[45] Date of Patent: Jul. 28, 1998

[54] ULTRASOUND DIAGNOSTIC APPARATUS

[75] Inventors: Kazuhiro Iinuma, Tochigi-ken; Tetsuya Kawagishi; Yasuhiko Abe, both of Otawara, all of Japan

[73] Assignee: Kabushiki Kaisha Toshiba, Kawasaki, Japan

[21] Appl. No.: 752,525

[22] Filed: Nov. 20, 1996

[30] Foreign Application Priority Data

Nov. 21, 1995 [JP] Japan .................................. 7-302902
Nov. 15, 1996 [JP] Japan .................................. 8-304757

[51] Int. Cl.⁶ .................................................. A61B 8/00
[52] U.S. Cl. ................................... 600/441; 600/453
[58] Field of Search ........................ 128/661.09, 661.1, 128/660.05, 660.07; 600/440, 441, 443, 453–456

[56] References Cited

U.S. PATENT DOCUMENTS

| 5,285,788 | 2/1994 | Arenson et al. | 128/600.05 |
| 5,309,914 | 5/1994 | Iinuma | |
| 5,450,850 | 9/1995 | Iinuma | 128/661.09 |
| 5,515,857 | 5/1996 | Tsujino et al. | 128/661.1 |
| 5,622,174 | 4/1997 | Yamazaki | 128/661.09 |

FOREIGN PATENT DOCUMENTS

| 62-266040 | 11/1987 | Japan . |
| 7-67451 | 7/1995 | Japan . |

OTHER PUBLICATIONS

H. Kanai et al., "A New Method for Measuring Small Local Vibrations in the Heart Using Ultrasound", IEEE Transactions on Biomedical Engineering, vol. 40, No. 12, pp. 1233–1242, 1993.

R.W. Stadler et al., "The Application of Echo–Tracking Methods to Endothelium–Dependent Vasoreactivity and Arterial Compliance Measurements", Ultrasound in Med. & Biol., vol. 22, No. 1, pp. 35–42, 1996.

A.P.G. Hoeks et al., "Assessment of the Distensibility of Superficial Arteries", Ultrasound in Med. & Biol., vol. 16, No. 2, pp. 121–128, 1990.

A.P.G. Hoeks et al., "Transcutaneous Detection of Relative Changes in Artery Diameter", Ultrasound in Med. & Biol., vol. 11, No. 1, pp. 51–59, 1985.

*Primary Examiner*—Francis Jaworski
*Attorney, Agent, or Firm*—Finnegan, Henderson, Farabow, Garrett & Dunner, L.L.P.

[57] ABSTRACT

An ultrasound beam is repeatedly transmitted and received to and from an object, so that an echo signal is repeatedly obtained. A velocity of each of a plurality of portions on the ultrasound beam is calculated based on the echo signal. A position of at least one specific portion of the plurality of portions is tracked in as it changes with the passage of time based on the velocity to obtain a path where the specific portion moves. Conventionally the change of brightness of the M-mode image was tracked to obtain the path. According to the present invention, since the path is obtained based on the velocity having high resolution, the accuracy of track can be improved.

31 Claims, 11 Drawing Sheets

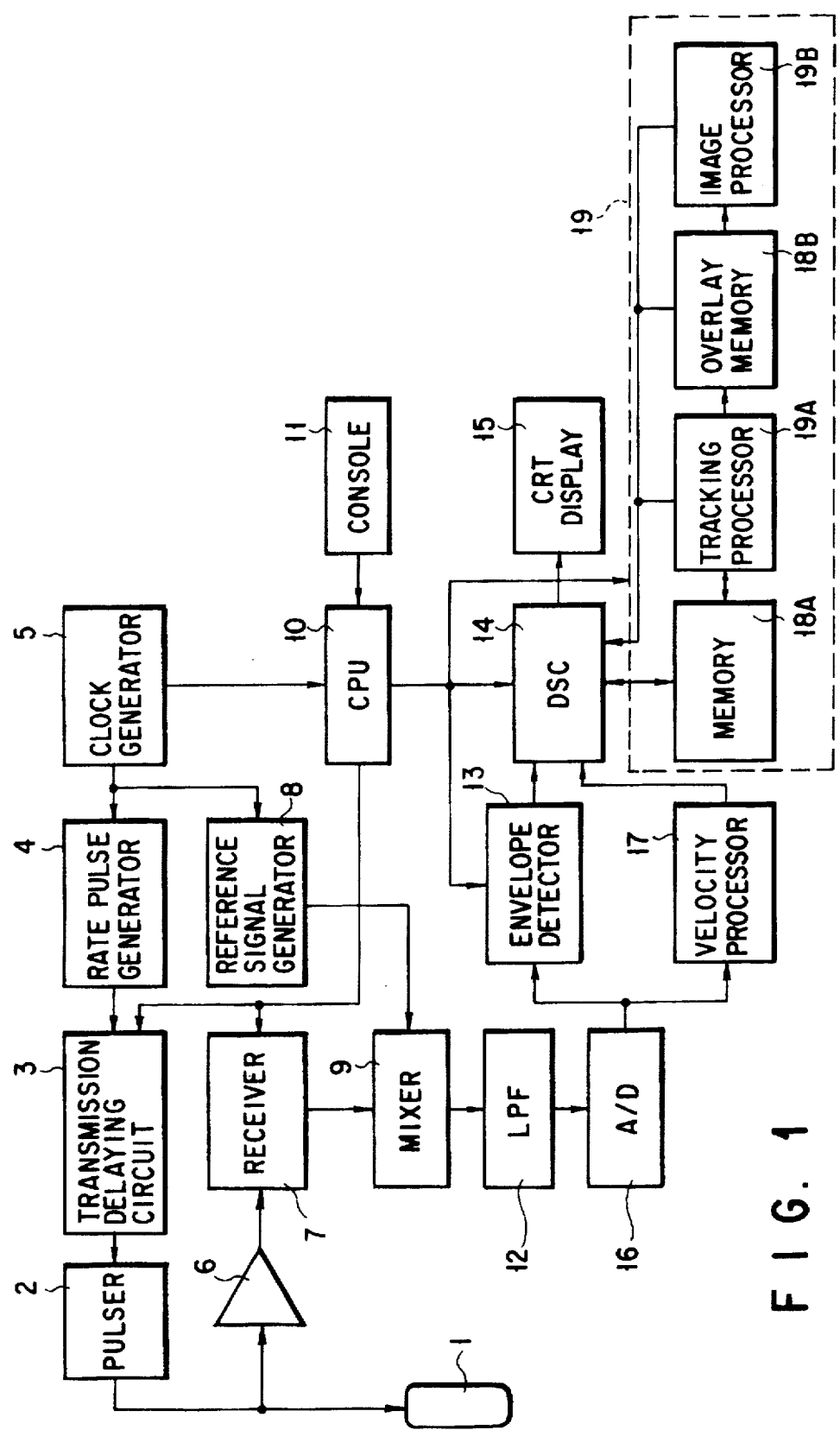
F I G. 1

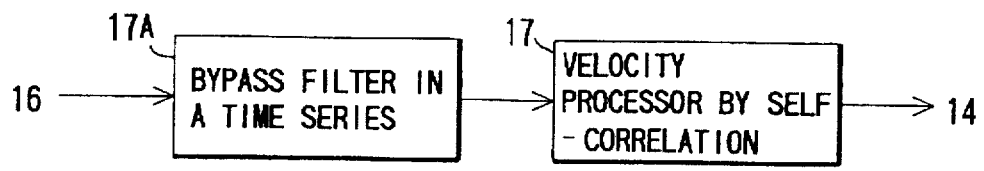
F I G. 2
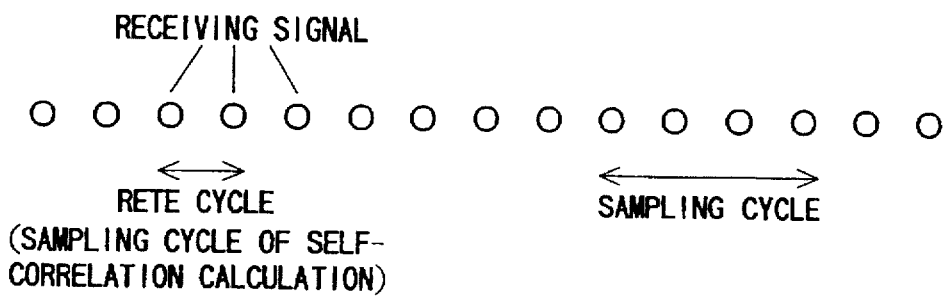
F I G. 3
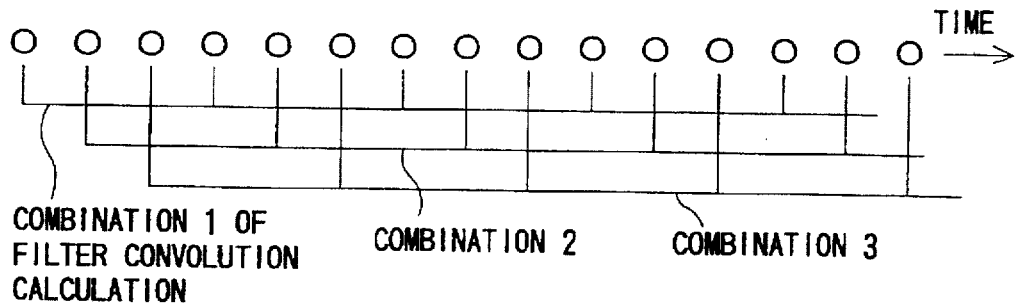
F I G. 4
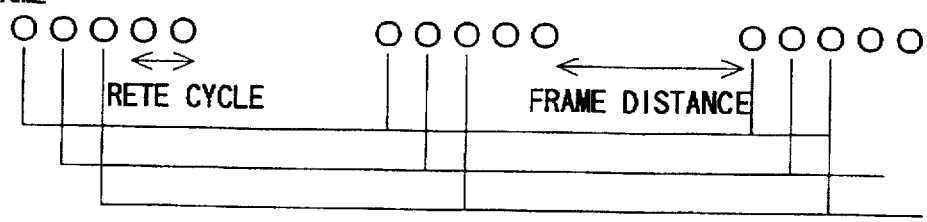
F I G. 5

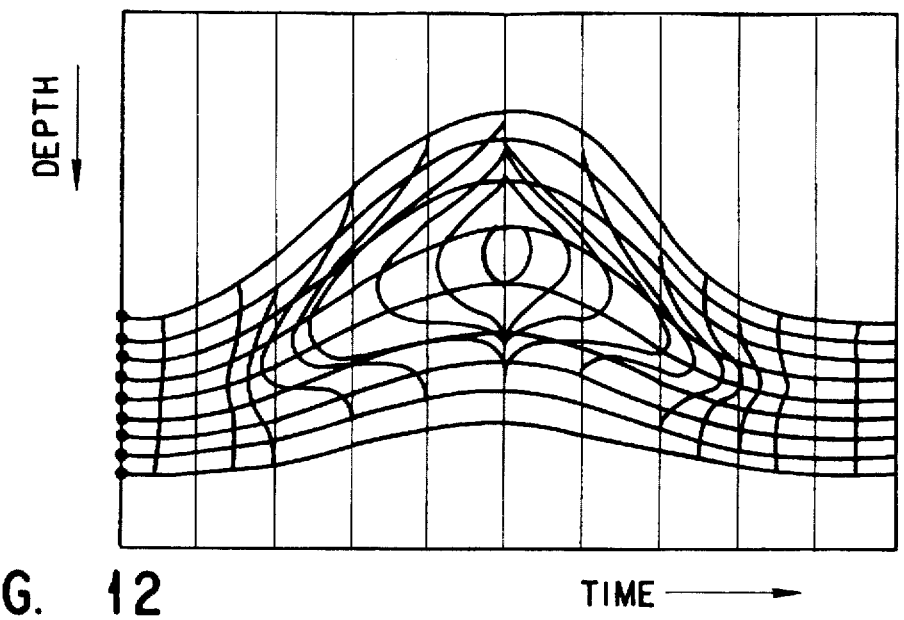
F I G. 12
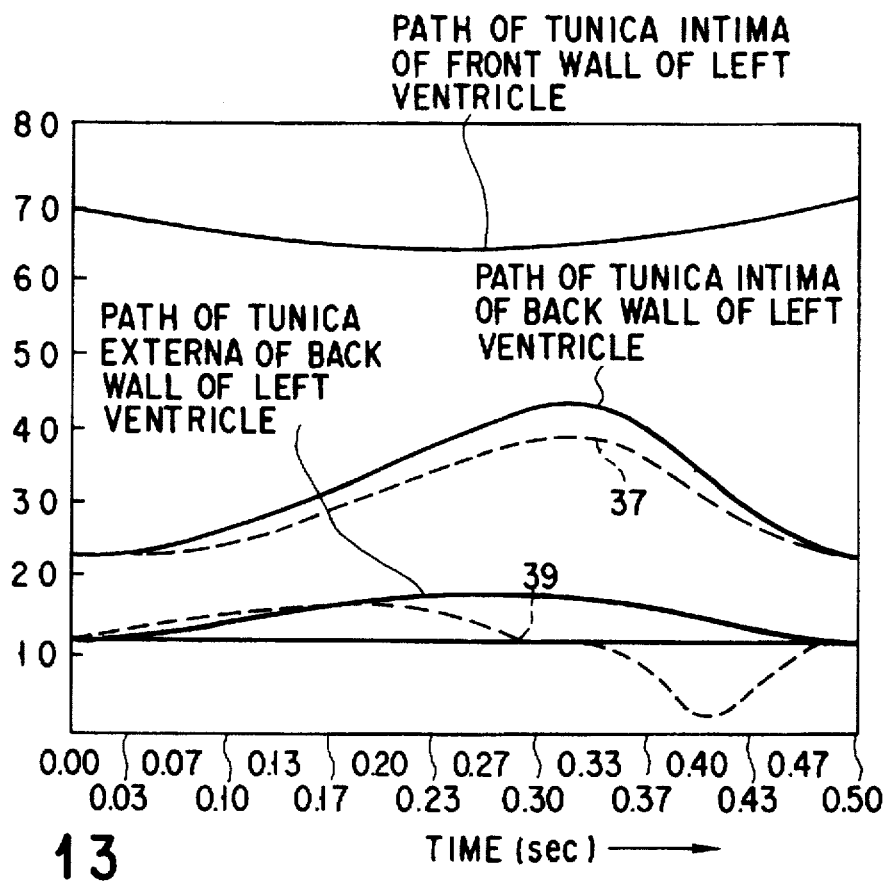
F I G. 13

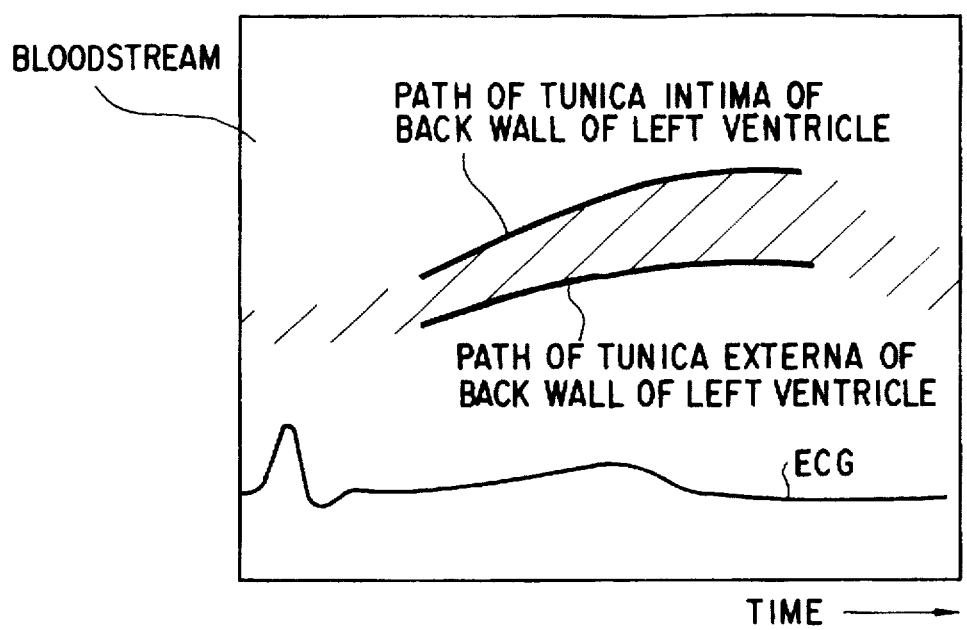
F I G. 14
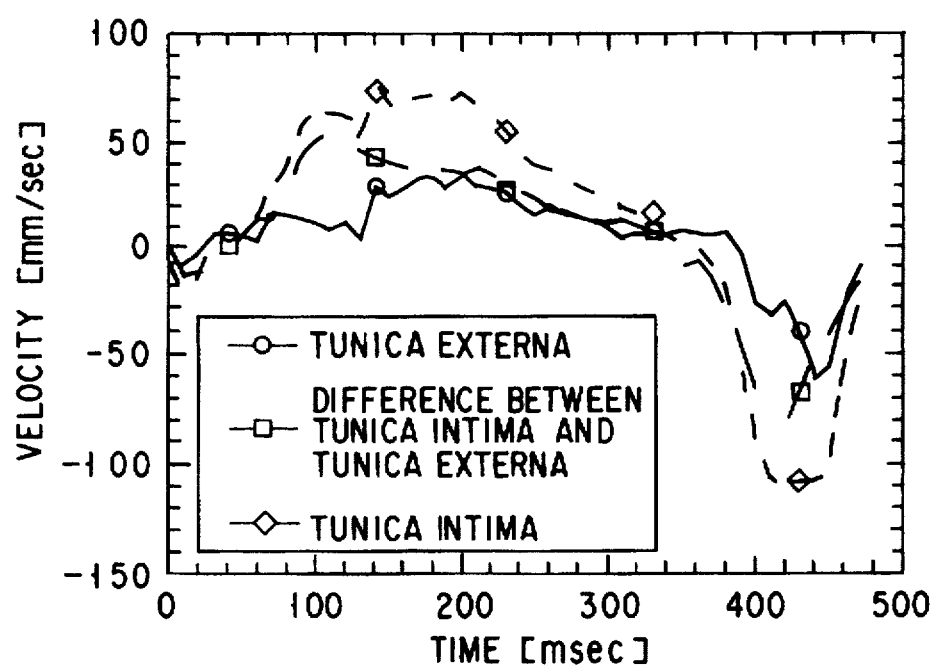
F I G. 15

ULTRASOUND DIAGNOSTIC APPARATUS

BACKGROUND OF THE INVENTION

1. Field of the Invention

The present invention relates to an ultrasound diagnostic apparatus for scanning an internal portion of an object with an ultrasound beam so as to obtain internal data.

2. Description of the Related Art

An ultrasound diagnostic apparatus comprises various operation modes such as a B mode, and an M mode, a CFM mode (color flow mapping mode) In the case of the B mode, a tissue structure of a cross section of an object can be dynamically observed. In the case of the M mode, regarding a tissue structure on one scanning line, a change of the tissue structure in a time series can be dynamically observed. In the case of the CFM mode, a state of blood flow of the object can be dynamically observed.

In the field of the ultrasound diagnosis, various trials have recently been made to quantitatively obtain various data of a living body. In most cases, it is necessary that a position of a specific portion on the M-mode image be tracked so as to obtain the path (or track) of the motion of the specific position. However, since such a tracking operation was executed based on luminance of the M-mode image, its accuracy was very low.

In "Assessment of the Distensibility of Superficial Arteries" by A. P. G. Hocks et al, Ultrasound in Med. & Biol., Vol. 16, No. 2, pp 121–128, 1990, the following method was described.

Specifically, an RF signal, which is a reflected wave itself, is retrieved by to the computer to be analyzed. Displacement thus is obtained from the change of the phase of the RF signal, such that a minimal change as in carotid arteries may be tracked.

However, since the above method is used for the purpose of there physiological study, it is difficult to use such a method in a clinical examination. For example, the method is not suitable for examining the large motion of tissue, which exceeds a sample volume. Further, in the above method, because there is not a display method which is useful to a general diagnosis, such a method would not be suitable for the clinical application.

SUMMARY OF THE INVENTION

An object of the present invention is to provide an ultrasound diagnostic apparatus, which can easily track a position of a specific portion very accurately in various types of clinical examinations, and which can provide information useful to a clinical diagnosis.

According to the present invention, there is provided an ultrasound diagnostic apparatus comprising:

means for repeatedly transmitting and receiving an ultrasound beam to and from an object to repeatedly obtain an echo signal;

velocity calculating means for calculating a motion velocity of each time phase of a plurality of portions on the ultrasound beam based on the echo signal;

tracking means for tracking a position of at least one specific portion of the plurality of portions as it changes with the passage of time based on the velocity to obtain a path where the specific portion has moved; and display means for displaying the path or said position the specific portion after movement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE INVENTION

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of an ultrasound diagnostic apparatus of a preferred embodiment of the present invention;

FIG. 2 is a block diagram of a velocity processor of FIG. 1;

FIG. 3 shows a sampling cycle of a high-pass filter of FIG. 2;

FIG. 4 shows data to be sampled by the high-pass filter of FIG. 2;

FIG. 5 shows another data set to be sampled by the high-pass filter of FIG. 2;

FIG. 12 shows an example of a contour map prepared by the tracking processor of FIG. 1;

FIG. 13 shows an example of function data of the cardiac muscle prepared by the tracking processor of FIG. 1;

FIG. 14 is a view showing one example of the function data of the lumen of the heart prepared by the tracking processor of FIG. 1;

FIG. 15 is a view showing one example of the other function data of the cardiac muscle prepared by the tracking processor of FIG. 1;

DETAILED DESCRIPTION OF THE PREFERRED EMBODIMENTS

Figure 6:
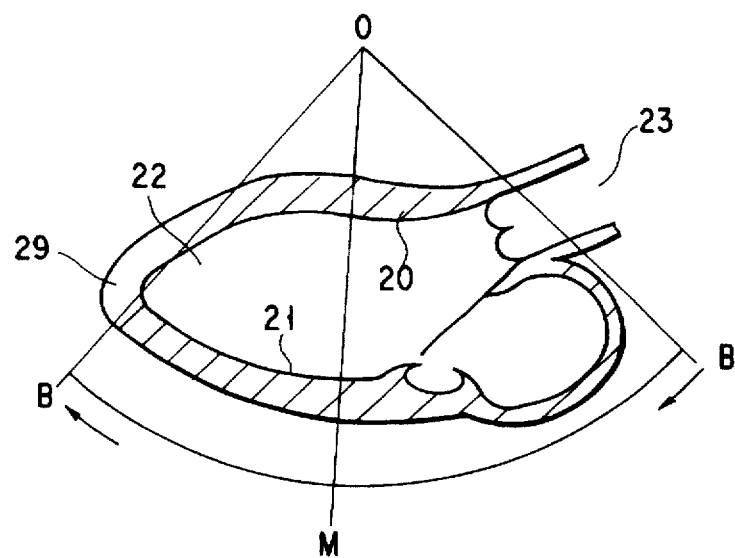
FIG. 6 is a cross-sectional view for explaining a combination scan of B mode and M mode.

Embodiments of the present invention will now be described with reference to the accompanying drawings.

FIG. 1 shows the structure of the ultrasound diagnostic apparatus of the present invention. A clock generator 5 generates a clock pulse (e.g., 30 MHz). The clock pulse is divided to e.g., a rate pulse of 5 KHz, by a rate pulse generator 4. The rate pulse is delayed by a transmission delaying circuit 3 so as to be supplied to a pulser 2 as a trigger signal. The pulser 2 supplies a drive pulse of, e.g., 3.75 MHz to an ultrasound probe 1 in accordance with the trigger signal supplied from the transmission delaying circuit 3.

The drive pulse oscillates a piezoelectric element, which is provided in the ultrasound probe 1, so as to generate an ultrasound beam whose central frequency is 3.75 MHz. Such an ultrasound beam is synchronized with the rate pulse, and repeatedly generated at a pulse repetition period of a reciprocal number of a pulse repetition frequency.

In a case of a sector scan, delay time is gradually changed every time when the ultrasound is received/transmitted. As a result, the angle of the ultrasound beam is changed little by little, and the fan-shaped cross section of an object is scanned. In the case of a linear scan, a group having a small number of elements of the plurality of the piezoelectric elements is driven at one time. Then, every time when the ultrasound is received/transmitted, the group is moved little by little. As a result, the position of the ultrasound beam is gradually moved, and the rectangular cross section of the object is scanned.

The ultrasound beams generated from the probe 1 enter the object, and are reflected by the boundary of an acoustic impedance. Then, the ultrasound beams are returned to the probe 1, so as to be converted to electrical signals at each of the piezoelectric elements of the probe 1. These electrical signals are amplified by a preamplifier 6, and individually delayed by a receiver 7. Then, these electrical signals are added to each other so as to be used as an echo signal.

By such a processing, an echo from a specific direction is emphasized.

Due to a quadrature phase detection, the echo signal is multiplied by a reference signal from a reference signal generator 8 by a mixer 9, and is passed through a low-pass filter (LPF) 12. Moreover, the echo signal is converted to a digital signal by an analog-digital converter (A/D converter) 16, and fetched to each of an envelope detector 13 and a velocity processor 17.

The envelope detector 13 detects the envelope of amplitude of the echo signal. The envelope of the echo signal shows the density of the echo signal from the tissue structure on the scanning line. Envelope data is converted to a television system by a digital scan converter (DSC) 14, and displayed on a CRT display 15 as a B-mode image or an M-mode image.

An output of an A/D converter 16 is supplied to the velocity processor 17. A velocity of each of points in the scanning range is obtained by a calculation. This velocity data is sent to DSC 14. Then, velocity data is overlaid on the B-mode image or the M-mode image to be displayed with a color image as a two dimensional velocity distribution.

The velocity processor 17 calculates the velocity of the tissue based on the echo signal from the analog digital converter 16 in accordance with a self-correlation. The calculation of the velocity of the tissue is known as a tissue doppler imaging (TDI) (Japanese Patent Application KOKAI Publication No. 62-266040, Japanese Patent Application KOKOKU Publication No. 7-67451). In this case, the velocity of the tissue may be directly calculated from the echo signal. Or, the velocity of the tissue may be calculated after the echo signal is passed through the filter to reduce noise.

DSC 14 is controlled by a CPU 10. When DSC 14 receives a data collection signal from a console 11, at least one of B-mode image data of DSC 14 and M-mode image data, and the corresponding velocity data are stored in a built-in memory 18A of a measuring processor 19. At this time, data of the measuring processor 19 is sent to DSC 14 again and displayed on a CRT display 15. If the image on the CRT display 15 is a still image, an operator operates the console 11 as looking at a still image on the CRT display 15 so as to set a "measuring point" a "display range (time range of tracking path)" a "display method" etc. If the image on the CRT display 15 is a motion image, the operator operates the console 11 after freezing the motion image to change to a still image. Regarding a specific image, the "measuring point" the "display range (time range of tracking path)" the "display method" etc. are automatically set by the CPU. If the operator pushes the button of the console 11, a tracking processor 19A measures and processes the change (displacement) in a time series of the position of the portion corresponding to the measuring point. The result corresponding to the purpose is displayed on the CRT display 15 through DSC 14.

The console 11, the velocity processor 17, the measuring processor 19, and the portion excepting a part of the function of the CPU10 are already put to practical use in the general ultrasound diagnostic apparatus and the tissue doppler imaging method (TDI), and the specific explanation is omitted. The following will explain the characteristic portions of the present invention.

(Noise Reduction)

Such noise, when a tissue velocity is obtained, mainly includes fixing echo noise components, which are generated by a multiple reflection and a side probe. To remove the fixing echo noise components, a high pass filter 17A shown in FIG. 2 is preferably used. As the high pass filter 17A, any of an FIR (finite impulse response) type, which is known as a digital filter, and an IIR (infinite impulse response) type may be used.

As is known, since the movement of the tissue is slower than the blood stream, the frequency of the tissue components of the echo signal is lower than that of the blood stream. Due to this, the frequency resolution of the high pass filter 17A must be enhanced such that the signal components are left and only the fixing echo noise is removed well when the frequency of the signal is greatly low and is close to zero. Also, the observing time of the high pass filter 17A must be increased to enhance the frequency resolution. To realize the increase in the observing time, as shown in FIG. 3, n is preferably set to an integer of 2 or more. Also, the sampling cycle of the high pass filter 17A is preferably set to a value, which n times as large as the pulse repetition period. The above-mentioned setting can be realized as follows.

Specifically, as shown in FIG. 4, data sets, which are weighted and added by the high pass filter 17A, are dispersively collected at the sampling cycle, which n times as large as the pulse repetition period. Even if the observing time is increased to obtain a desired filter characteristic by the above-motioned setting, an amount of data is not so increased. As a result, the high pass filter 17A can be made compact.

In the case of the combination of TDI-mode scan and B-mode scan, as shown in FIG. 5, the sampling cycle of the high pass filter 17A is set to a frame cycle, which is required to scan the cross section of the object.

(Real Time Processing)

For example, in the examination of the heart, the probe 1 is put on the surface of a chest wall, and the cross section of the heart is scanned with the ultrasound beam as shown in FIG. 6. The slanting line portion of the scan range of the cross section of the heart is generated in the B-mode image by the envelope detector 13 so as to be displayed on the CRT display 15. In FIG. 6, "0" corresponds to a top end position of the probe 1. This cross section is called a long axis view of a left ventricle. A cardiac muscle, which is close to "0", is called a anterior wall 20 of the left ventricle, and a cardiac muscle, which is far from "0", is a posterior wall 21 of the left ventricle. The blood of left ventricle 22 is sent to the whole body via an aorta 23 by the contraction of these cardiac muscles.

For example, lines of interest M for an M mode are designated on the B-mode image to cross the anterior wall 20 and the posterior wall 21. When the M-mode scan is singly executed, the ultrasound beam is transmitted to the direction of the lines of interest M, so that an echo is received from the direction of the lines of interest M. Such transmitting and receiving are repeated at the pulse repetition period, so that the echo signal is repeatedly obtained. The time wave of the velocity of each of the plurality of points on the lines of interest M is calculated based on the echo signal by the velocity processor 17. TDI (tissue doppler imaging) is used to obtain not the blood stream but the velocity of the tissue. Moreover, the cross section is scanned with the ultrasound beam, so that a two-dimensional velocity distribution of the tissue can be obtained. Normally, unlike the blood stream imaging, TDI can be realized by subjecting the quadrature phase detection signal to a frequency analysis processing such as a self-correlation without being passed through a MTI filter (band filter). Among the latest apparatus, there is an apparatus, which can easily change the B-mode image and the TDI image to be displayed. For this reason, the B-mode image and the TDI image can be simultaneously displayed as required. B-mode and TDI cross-sectional images can be displayed at real time so as to observe the state of the contraction and expansion of the cardiac muscles.

(Data Collection)

From designated time till predetermined time, e.g., a four-beat period is passed, data (M-mode data) of echo density of the tissue of the lines of interest M calculated by the real time processing and velocity data of the tissue of the lines of interest M are continuously fetched and stored in a memory 18 from DSC 14.

The memory area of the built-in memory of DSC 14 corresponds to the display screen, and one memory element corresponds to one pixel. The pixel is a minimum unit forming the image. The pixel is frequently set to be adjusted to the display screen. The pixel pitch is not limited to the pitch of the scanning line of the ultrasound beam or the integer multiple of the pulse repetition period. The pixel pitch is often set to the intermediate value of the pitch of the scanning line of the ultrasound beam or the integer multiplex of the pulse repetition period. In the memory area, amplitude data and velocity data are stored at the position where a horizontal axis is time and a vertical axis is a depth, and these data are directly fetched to the built-in memory 18A of the measuring processor 19. In this case, amplitude data and velocity data stored at an address corresponding to the collecting time and the collecting position.

If such a data collection is ended, the real time processing is ended, and a tracking processing is executed using stored data.

(Preparation of Tracking)

The preparation of tracking is started as follows.

Figure 8:
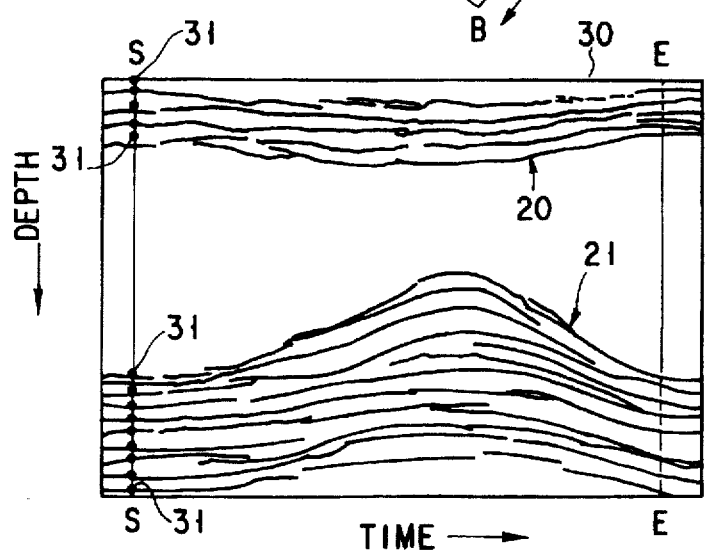
FIG. 8 shows an example of an M-mode image displayed on a CRT display of FIG. 1.

Specifically, data of echo density of the tissue stored in the memory 18A is read so as to be displayed on the CRT display 15 as an M-mode image as shown in FIG. 8.

The operator designates a tracking start line (S—S) and a tracking end line (E—E) by the console 11. The time range can be automatically set to a R—R interval of an electrocardiogram, which is prepared in advance, in the case of the heart by CPU. Also, the end line can be automatically set to the point where the data collection is ended. A portion between these two lines is a time range of an object to which tracking processing is subjected. A tracking processor 19 sets tracking start points 31 with a distance, e.g., 2 mm, on the start line S—S. The operator selects an arbitrary start point 31 from these start points 31. The selection of the start point 31 should be determined in accordance with the diagnostic purpose.

(Tracking Processing)

Figure 9:
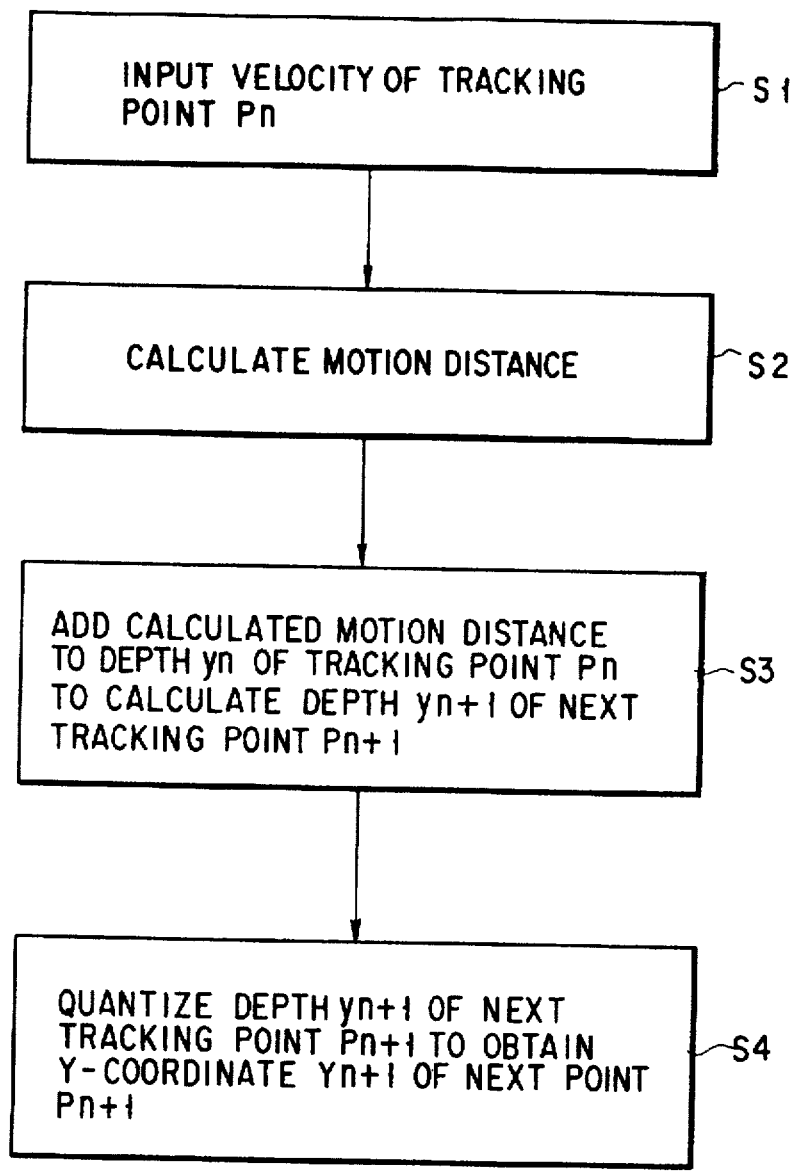
FIG. 9 is a flow chart showing tracking steps by use of a tracking processor of FIG.1.
Figure 10:
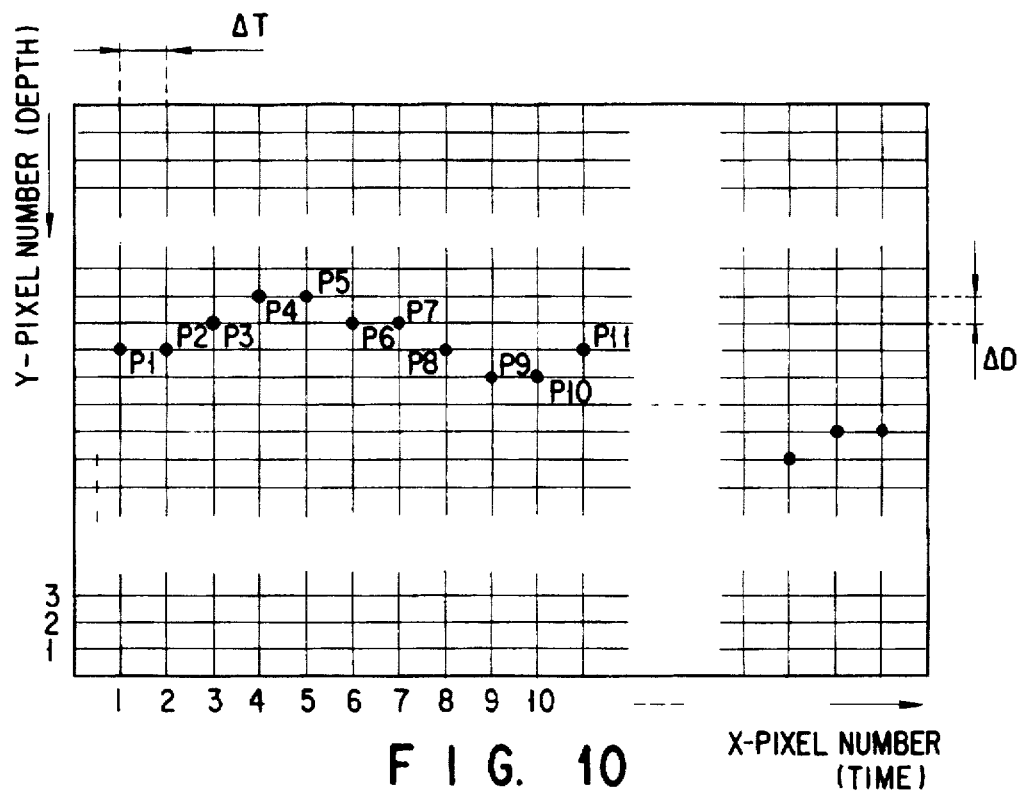
FIG. 10 is a chart of the tracking steps of FIG. 9.

If the above-mentioned preparation is ended, the tracking processor 19A starts the tracking processing. In the tracking processing, the selected start point 31 is used as a start point. FIG. 9 shows the steps of the tracking processing in a state that a certain start point 31 is used as a start point. FIG. 10 shows a plane corresponding to the display screen of CRT display 15. In this case, it is assumed that a cross point of vertical and horizontal lines of the plane corresponds to one pixel of the CRT display 15, and also corresponds to the structure of the built-memory of DSC 14. The pixel is a minimum unit for forming an image. A interval (pixel pitch) between two adjacent pixels is a value peculiar to DSC 14 for generating the image displayed on CRT display 15. The pixel pitch is not always conformed to the interval between the scanning lines of the ultrasound beams and the pulse repetition period. The vertical axis of the plane corresponds to a depth, and the horizontal axis corresponds to time. If the pixel pitch between adjacent two pixels with respect to a vertical direction (Y) is converted into a real distance, the pixel pitch corresponds to a unit distance $\Delta D$. If the pixel pitch between adjacent two pixels with respect to a horizontal direction (X) is converted into a real distance, the pixel pitch corresponds to a unit time $\Delta T$ (msec).

In this case, to reduce the difference in quantization, the depth of the portion is calculated by a real scale (mm). Then, the depth is quantized by the pixel pitch so as to be converted to a Y-coordinate. The depth is expressed by y, and the Y-coordinate is expressed by Y.

First, velocity V1 of a position P1 (start point 31) is read to the tracking processor 19A from the memory 18A (S1). Then, the read velocity V1 is multiplied by the unit time $\Delta T$. As a result, the motion distance (displacement) in which a portion positioned at point P1 at time (1) is moved during unit time $\Delta T$ is calculated (S2).

For calculating the displacement, time by which the velocity is multiplied may not be unit time $\Delta T$ corresponding to the pixel pitch. In this case, time is preferably set to an integer or 1/an integer multiple of unit time $\Delta T$.

The obtained displacement is added to depth y1 of the Y-coordinate of P1, and depth y2 of a next point P2 is calculated (S3). Then, y1 is obtained by multiplying the number of pixels between P1 and the probe 1 by ΔD. Then, y2 is quantized by the unit distance ΔD to be used as a point P2 (S4), and the quantized Y- and X-coordinates of point P2 are written to an overlay memory 18B (S5).

Similarly, velocity V2 of a position P2 is read to the tracking processor 19A from the memory 18A (S1). Then, the read velocity V2 is multiplied by the unit time ΔT so as to obtain a motion distance (displacement)(S2). Then, the obtained displacement is added to the depth y2, which is not yet quantized, so that a depth y3 for obtaining a next point P3 is calculated (S3). Then, y3 is quantized by the unit distance ΔD to be used as a point P3 of Y-coordinate (S4), and the quantized Y- and X-coordinates of point P3 are written to an overlay memory 18B (S5).

Thus, the position of the portion shown by point P1 is sequentially tracked, so that the path (track) of the motion of the corresponding portion can be obtained.

In the above example, velocity V2 was used in the calculation of the motion distance for obtaining point P3. However, in a case where the tacking accuracy is regarded as importance, the velocity corresponding to the depth y2 of Y-coordinate, which is not yet quantized, may be obtained from the velocity with respect to the pixel positioned close to P2 by interpolation. In this system, if the calculation cycle of FIG. 9 is repeated, there is possibility that the tracking error will occur. Due to this, it is important to obtain the depth correctly. Thereafter, the obtained depth should be quantized to be displayed. In a case where the tracking accuracy is not regarded as importance, the tracking may be performed on the Y-coordinate.

Figure 11:
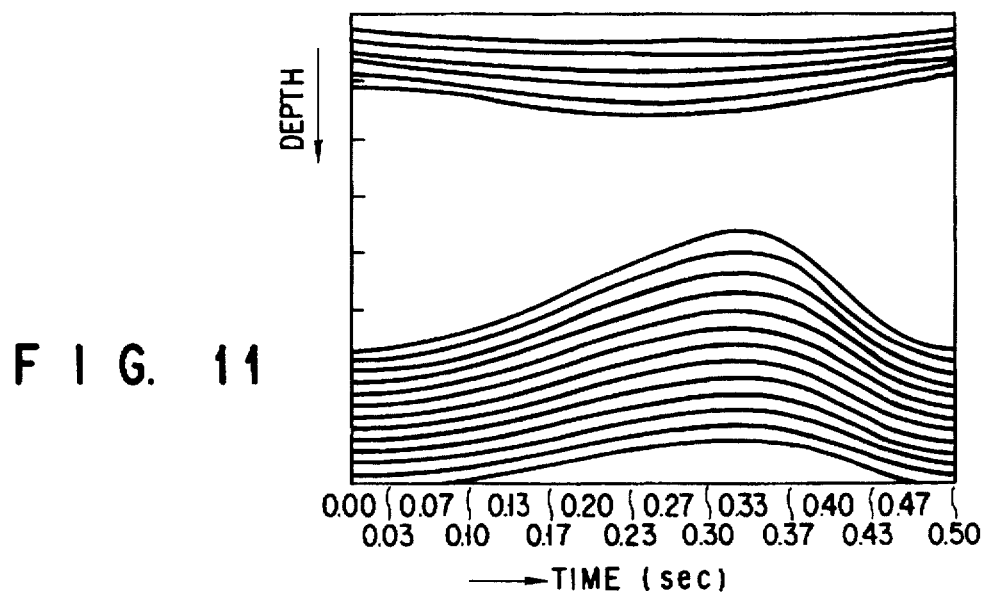
FIG. 11 shows an example of a plurality of paths (tracks) prepared by the tracking processor of FIG. 1.

Similarly, the other selected start points 31 are tracked, so that their paths (tracks) can be obtained. FIG. 11 shows an example in which the plurality of paths is displayed.

In this example, the tracking is performed in a forward direction to the time passage. However, the tracking may be performed in an opposite direction to the time passage. In this case, since the current of time is reversed, the displacement is subtracted from the Y-coordinate so as to calculate the next point.

Thus, the displacement is obtained from the velocity, and the obtained displacement is integrated on the Y-coordinate of the start point, and the result of the integration is quantized to be displayed. As a result, the tracks (paths) can be obtained with high accuracy as compared with the conventional case in which the paths are tracked from the M-mode image based on luminance. If the accuracy of the velocity measurement is 1 mm/s or less and time required to the measurement is 10 ms, the distance resolution of the track of the present invention is 0.01 mm. According to the conventional case, in the distance resolution of the M mode, the wavelength was 0.3 mm in the case of the frequency 5 MHz of the ultrasound. This was the limit value of the conventional track.

Also, velocity data of the tissue of the necessary portion is calculated in advance. Then, velocity data and M-mode (or B-mode) data are made to correspond to each other in relation to the measuring position so as to be stored in the DSC memory. Various processing set forth below are subjected to data stored in the DSC. As a result, comparing a case that the displacement is directly obtained from RF data, the data display, which has a good operability and which is useful to the clinical diagnosis, can be performed.

(Application of Track)

Since the track can be easily obtained with high accuracy, the track is variously applied, so that data, which is useful to the diagnosis, can be obtained. The application is executed by an image processor 19B. For example, a third path (track) having higher accuracy can be obtained from a first path (track) and a second path (track). In this case, the first path was obtained by tracking in the forward direction to the time passage. The second path was obtained by tracking in the reverse direction where the end point of the first path is used as a start point. The third path is a central line between the first and second paths. Also, the third path is formed by partially connecting the first and second paths. For example, only the portions where the positions of the first and second paths are conformed to each other are connected so as to obtain the third path. Otherwise parts that the first and second paths are coincided with each other are displayed as the third path.

In the examination of the heart, the path of each heart beat cycle is obtained, and the plurality of paths each having a different heart beat cycle can be equalized. In other words, the R wave of the electrocardiograph is standardized, and the paths of the plurality of heart beats are overlaid to be displayed, or the average value is displayed. For example, even if the paths of the large number of heart beats having the same start point are varied, the average value is obtained. Then, the path, which largely deviates from the average value, is excluded from the plurality of paths, and the paths are equalized again. As a result, the difference in the paths can be minimized. Also, in displaying the path, the horizontal axis may be standardized such that the time axis is the heart beat cycle. As a result, an objective path having a small variation can be obtained. The general ultrasound diagnostic apparatus for a circulatory system has the electrocardiograph built-in, so that electrocardiogram data can be simultaneously collected easily.

FIG. 11 showed only the case in which the plurality of paths in the depth direction was simultaneously displayed. As shown in FIG. 12, the points, each having the same distance of each path, may be combined with each other with contour lines so as to form a contour map to be displayed. As a result, the state of the contraction of the cardiac muscle can be easily understood, so that an abnormal contraction portion can be easily discriminated. In the example of FIG. 12, it can be understood that the central portion of the cardiac muscle is strongly contracted. Since the interval between the contour lines is small, a portion of infarction where contraction is insufficient can be easily understood.

Similar to the map, specific colors are added to the contour lines such that the contour lines are further understandable. For example, the contour line, having motion distance longer than the reference distance, may be displayed with red. Moreover, the contour line, having motion distance shorter than the reference distance, may be displayed with blue.

Also, one path may be displayed in such a manner that luminance or the color is partially changed in accordance with density of the echo signal.

The following application can be executed.

Specifically, on the M-mode image of FIG. 8, a start point is designated to each of tunica intima and tunica externa of the posterior wall of the left ventricle so as to obtain each path. Then, the change in a time series of the distance between two paths can be obtained as a change in a time series of the thickness of the cardiac muscle. Moreover, from the change in a time series of the thickness of the cardiac muscle, there can be measured functional data such as the contraction velocity of the cardiac muscle, the maximum and minimum values of the thickness of the cardiac muscle, a contraction ratio, etc. FIGS. 13 and 14 show a change 37 in a time series of the thickness of the cardiac muscle, and a change 39 in a time series of the contraction velocity, i.e., a graph in which change 37 is time-integrated. Moreover, as shown in FIG. 15, there can be obtained a velocity change of each of tunica intima and tunica externa, and a change in a time series of the velocity difference (velocity change of thickness of cardiac muscle) between tunica intima and tunica externa.

Also, as shown in FIG. 13 or 14, the start point is designated to each of is designated to each of tunica intima and tunica externa of the posterior wall of the left ventricle so as to obtain each path. Then, the change in a time series of the distance between two paths can be obtained as a change in a time series of internal volume of the left ventricle can be estimated from the internal diameter of the left ventricle, a change in a time series of the volume can be obtained. Moreover, an ejection amount (blood volume for a period of one heart beat) or an ejection fraction can be obtained from the change in a time series of the volume.

Thus, if not only the paths but also various data obtained in accordance with the paths is displayed on, e.g., M-mode image, along the same time axis, data, which is directly useful to the diagnosis can be provided. For example, the path of FIG. 14 and the graph of the contraction velocity of the thickness of the cardiac muscle can be displayed on the same screen along the same time axis.

In addition, various data can be obtained in accordance with the paths. For example, a start point is designated to each of the upper and lower positions of a specific portion so as to obtain paths. Differences between distances of two paths and distances from start points on time-phases are divided by the distance of the start point, so that a change in a time series of the distortion of the portion can be obtained. From the change in a time series of the distortion, time interval of the portion having the same distortion may be obtained. Also, a change in a time series of, e.g., echo density of the position of the obtained path, the velocity, and the dispersion may be obtained. Moreover, the coordinates of the points on the above-obtained paths may be displayed by numeric values.

Figure 7:
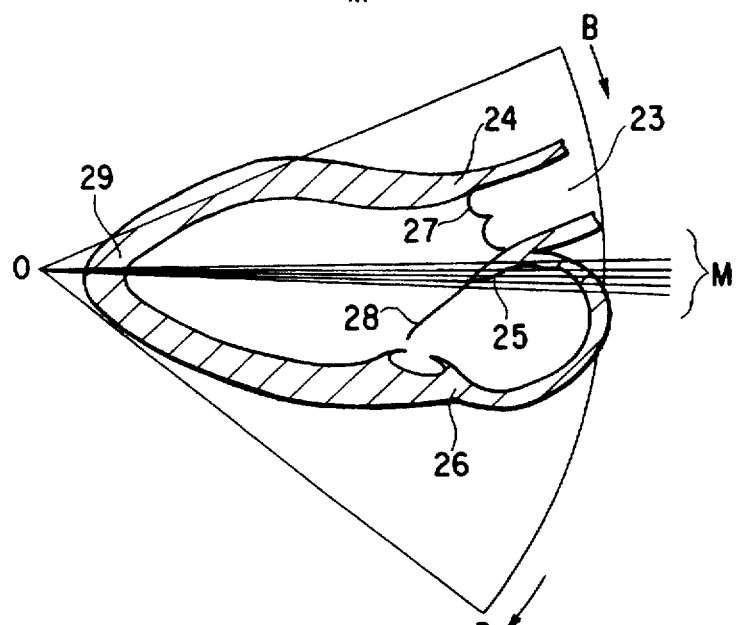
FIG. 7 is a cross-sectional view for explaining an M-mode scan.

As shown in FIG. 6, if the heart strongly sends the blood to the aorta 23 at its contraction time, the heart retreats to an apex cordis 29 by its reaction. Then, the heart returns to the original position when the blood flows from an atrium cardis at its expansion time. This movement shows power of the heart in connection with the inflow of the blood and the outflow. In this case, as shown in FIG. 7, the ultrasound beam is made incident from the top end portion of the heart, that is, apex cordis 29, to obtain the paths of upper and lower end portions of aortic annulus portions 24 and 25, which are respectively placed at the neck of an aortic valve 27 and that of a vulva mitralis 28. Normally, the annulus portion is formed of the hard tissue, and the ultrasound beam is strongly reflected upon the surface of the annulus portion. As a result, the heart can be easily observed with the ultrasound beam. As shown in FIG. 7, the method, in which the ultrasound beam is made incident from the apex cordis so as to observe the heart, is called an apex cordis approach. In the apex cordis approach, the lines of interest M are designated to cross the annulus portions 24 and 25 as observing the B-mode image of the cross section of the long axis of the heart. Then, the paths of the annulus portions 24 and 25 are obtained by the same method as the aforementioned method, respectively. As a result, the motion of the heart serving as the reaction of discharging the blood stream, that is, power of the heart can be estimated.

In the examination of the heart, there must be solved a problem in which a portion of interest deviates from the line of interest M by the influence of the heart beat movement. Particularly, since the valve portions 24 and 25 are relatively small, there is high possibility that the valve portions will deviate from the lines of interest M. To minimize the difference caused by the deviation from the line of interest M, a plurality of lines of interest M to cover most part of the valve portion 25 as shown in FIG. 7 is designated. Then, the paths of the lines of interest M are individually obtained, and these obtained paths are partially connected to form one path (track). As a result, the aforementioned difference can be minimized. As the connecting portion, there can be considered the portion, which is the closest to the apex cordis 29 at each time phase, or the portion having the highest density of reflection. Supposing that each of these paths is displayed by an appropriate color, and that these paths are overlaid. In this case, the color is set to correspond to the density of reflection or luminance, which is proportional to the density of reflection. As a result, the portion having the strongest luminance or the same color displays the displacement of the moving portion correctly.

The above explained the case in which the present invention was applied to the examination of the heart. Moreover, the present invention can be applied to the diagnosis of an abdominal organ as explained below.

Figure 16:
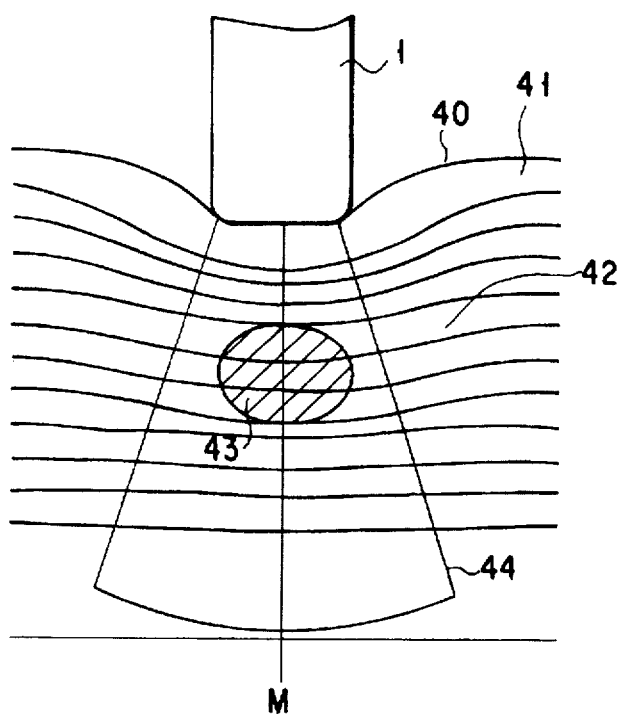
FIG. 16 is a schematic view of the tissue of the object, which is deformed by the pressure of a probe.
Figure 17:
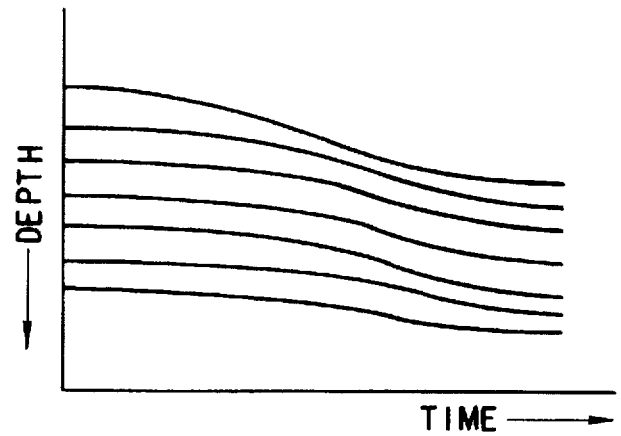
FIG. 17 is a view showing one example of the plurality of tracks of the deformed tissue of FIG. 16.

FIG. 16 is a schematic view of the cross section of the abdominal organ, e.g., liver. Under a surface 40, an abdominal muscle or a panniculus adiposus 41 is formed, and the tissue of a liver 42 is formed under the panniculus adiposus 41. If a tumor is formed in the liver, an M-mode image is displayed on the CRT display 15 in a beam direction passing through the tumor 43 as observing a tomographic image by pressing the probe 1 on the surface 40. Next, M-mode data and the change in a time series of the velocity are measured as deforming the internal tissue of the object by pressing the probe 1 onto the object. Then, each of the paths of a plurality of points of the liver, which are positioned in the beam direction, is obtained by the same method as mentioned above. If the tumor 43 is harder than the liver tissue around the tumor, the amount of deformation of the tumor is smaller than that of the liver tissue around the tumor, so that the paths as shown in FIG. 17 are obtained. If the tumor 43 is softer than the liver tissue around the tumor, the interval between the paths of the tumor becomes close to each other. Even if the tissue is one type, the tissue, which is placed at the shallow position, is largely deformed as compared with the tissue, which is placed at the deep position. As a result, if the displacement, which is standardized by the distance from the surface 40, that is, probe 1, is used, the actual deformation state can be correctly displayed. In this case, it is, of course, useful to display the amount of deformation by the contour lines or colors. In this system, the receive signal may be collected as changing the relative distance between the probe 1 and the vital tissue. In other words, the vital tissue may be deformed by the method other than the method in which the probe 1 is pressed to the surface.

The above explained one line of interest M. However, lines of interest may be set to all scanning lines scanning the cross section, respectively. For example, the probe 1 is softly pressed onto a surface 20, and lines of interest may be set to a part or all of the scanning lines crossing the tumor 43 in a scanning range 44, respectively. Then, start points are set on all lines of interest of the first image at equal intervals, for example, 2 mm, and the start points having the same depth are connected to each other. Then, the next point of each of the start lines is obtained based on the velocity. On the first image, the points, which are connected to each other by the same line, are connected to each other. Such a processing is repeated until the last image. Then, the image of each time phase is dynamically displayed. As a result, it is possible to observe the state that the connecting lines are distorted from the initial state that the connecting lines are parallel to each other in accordance with the distortion of the tissue.

Moreover, the motion distance of each of the plurality of portions in the cross section of the object, or the difference between adjacent two points in the motion distance is obtained. Then, the image of the spatial distribution of the motion distance is generated. In accordance with the motion distance, luminance-modulation or coloring is subjected to the image to be displayed. Also, such the image is repeatedly generated to be dynamically displayed. As a result, it is possible to spatially discriminate between a portion of a large motion and a portion of a small motion.

If the processing speed of the tracking processor 19 is high, for example, a line group, which is perpendicular to the beam, is automatically set at the first stationary position as a start point. As a result, the state of the deformation can be observed at real time as pressing the probe 1 onto the object.

The present invention can be applied to an automatic measurement of a diameter of a blood vessel, and measurement of the blood pressure. This application will be explained as follows.

Figure 18:
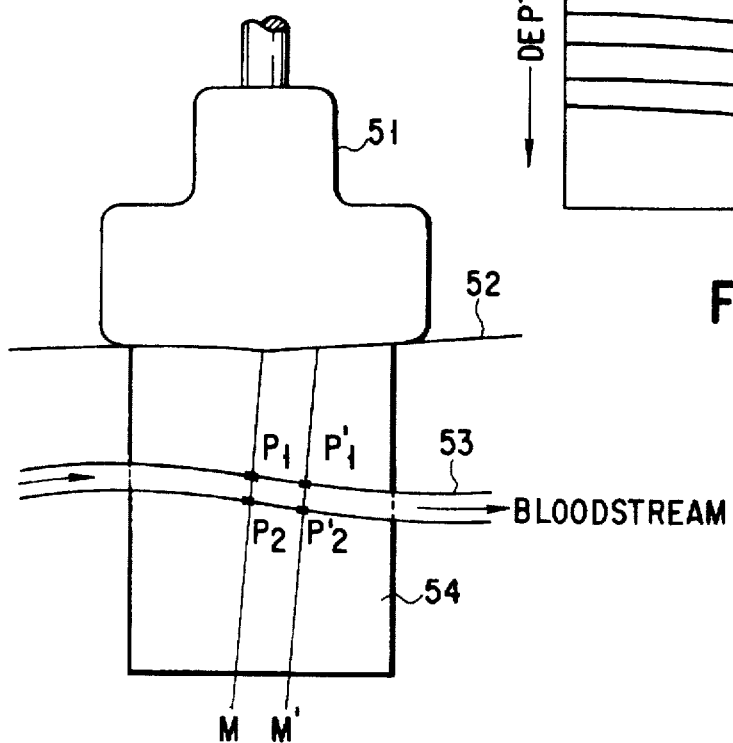
FIG. 18 is a schematic view showing a state in which a cross section including an arterial blood vessel is scanned by a linear probe.
Figure 19:
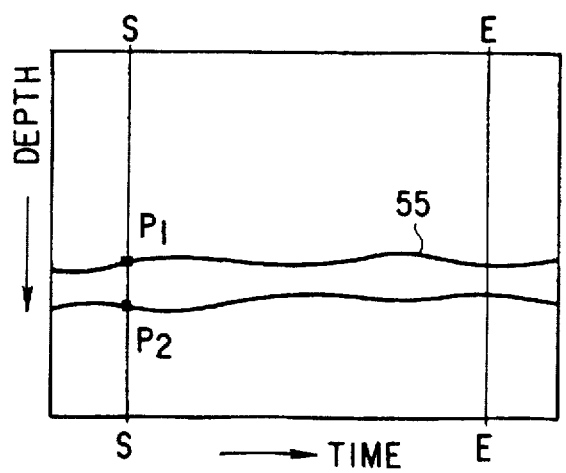
FIG. 19 is a view showing the track of each of upper and lower ends of the blood vessel of FIG. 18.

As shown in FIG. 18, for example, a linear probe 51 is pressed onto a surface 52, and a scanning surface 54 is adjusted to cross an arterial blood vessel 53. Then, the operator sets the line of interest M to cross the arterial blood vessel 53 as watching the B-mode image. Echo data of tissue of the line of interest M and velocity data are fetched to be stored in the memory 18A. In place of the linear probe 51, a sector probe may be used. The M-mode image is displayed on the CRT display 15 through the DSC 14 based on echo data of the tissue as shown in FIG. 19. An image, which corresponds to the cross section of the arterial blood vessel 53, may be, of course, displayed on the CRT display 15.

On the M-mode image, a wall 55 of the arterial blood vessel is confirmed, and start points P1 and P2 are designated to upper and lower ends of the wall 55, respectively. Then, two paths starting from the start points P1 and P2 are obtained, respectively. The distance between two paths of each time phase is obtained. This shows a change in a time series of the diameter of the blood vessel.

The accuracy of the change in a time series of the diameter of the blood vessel is 0.01 mm if the accuracy of the velocity measurement is 1 mm/s or less and time required to the measurement is 10 ms.

If the diameter of the blood vessel can be accurately measured, the pressure of the arterial blood varies in a time series. In this case, the maximum value of the blood pressure is called highest blood pressure, and the minimum value of the blood pressure is called lowest blood pressure. The highest and lowest pressure can be measured by a hemomanometer. However, there is no method for measuring the change in a time series of the blood pressure, corresponding to the intermediate value, without damaging the organism. Since the change of the diameter of the blood vessel is extremely small, it can be considered that the variation of the blood pressure is proportional to the change of the diameter of the blood vessel. If the blood pressure at time t=p(t), the lowest blood pressure=p0, the highest blood pressure=Pm, the diameter of the blood vessel=D(t), the diameter of the blood vessel at the time of the lowest blood pressure=D0, the diameter of the blood vessel at the time of the highest blood pressure=Dm, a change of D(t)=d(t), and k=a proportional constant, the following equations (1) and (2) can be established. In this case, the lowest blood pressure p0 and the highest blood pressure pm can be measured by the hemomanometer.

$$d(t)=D(t)-D0=k\{p(t)-p0\} \quad (1)$$

$$Dm-D0=k(pm-p0) \quad (2)$$

From equations (1) and (2), blood pressure p(t) can be obtained by the following equation (3).

$$p(t)=p0+(pm-p0)\cdot\{d(t)/(Dm-D0)\} \quad (3)$$

Figure 20:
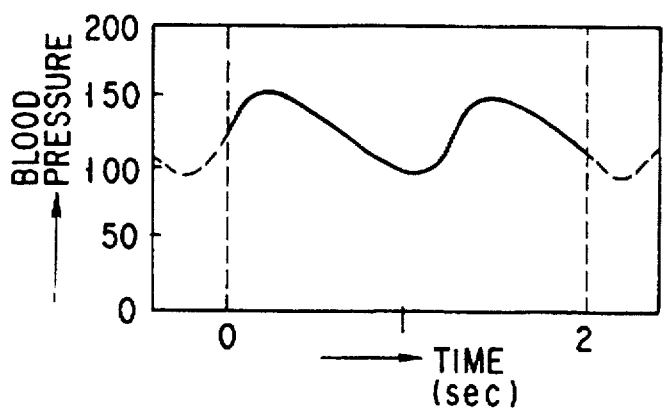
FIG. 20 is a view showing one example of a time waveform of the blood pressure prepared by the image processor of FIG. 1.

FIG. 20 shows an example in which the change of p(t) in a time series is displayed on the CRT display 15 as a graph. Though the change in a time series of the blood is extremely small, the minute displacement can be measured with high accuracy by the system of the present invention.

The highly accurate path according to the present invention is capable of measuring the velocity of a pulse wave. In the blood vessel, particularly a thick blood vessel, the pulse wave exists. The heart contracts to open the aortic valve, and the blood is sent to the whole body via the aorta. In this case, the blood pressure of the aorta sharply rises, and the aorta locally expands. The expanded portion is propagated through the blood vessel. This is the pulse wave, and the velocity of the pulse wave propagation serves as an indicator for showing the hardness of the blood vessel. Specifically, in a case where arterial sclerosis advances and the blood vessel becomes hard, the velocity of the pulse wave propagation is high. On the other hand, in the case of the soft blood vessel, the velocity is low. Thus, the velocity of the pulse wave propagation is measured so as to be used in the diagnosis of arterial sclerosis.

The following will explain a method for measuring the velocity of the pulse wave propagation.

Figure 21:
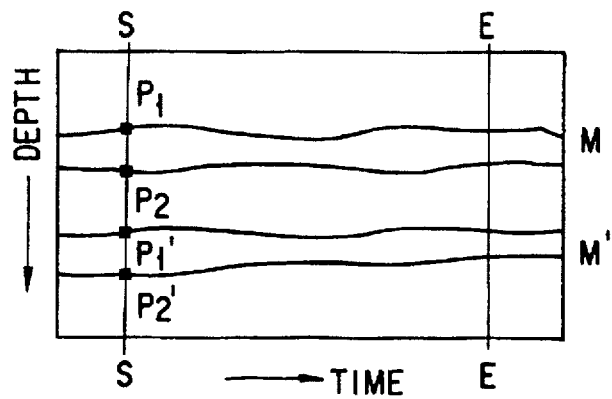
FIG. 21 is a view showing one example in which the tracks of two lines of interest of FIG. 18 are simultaneously displayed.
Figure 22:
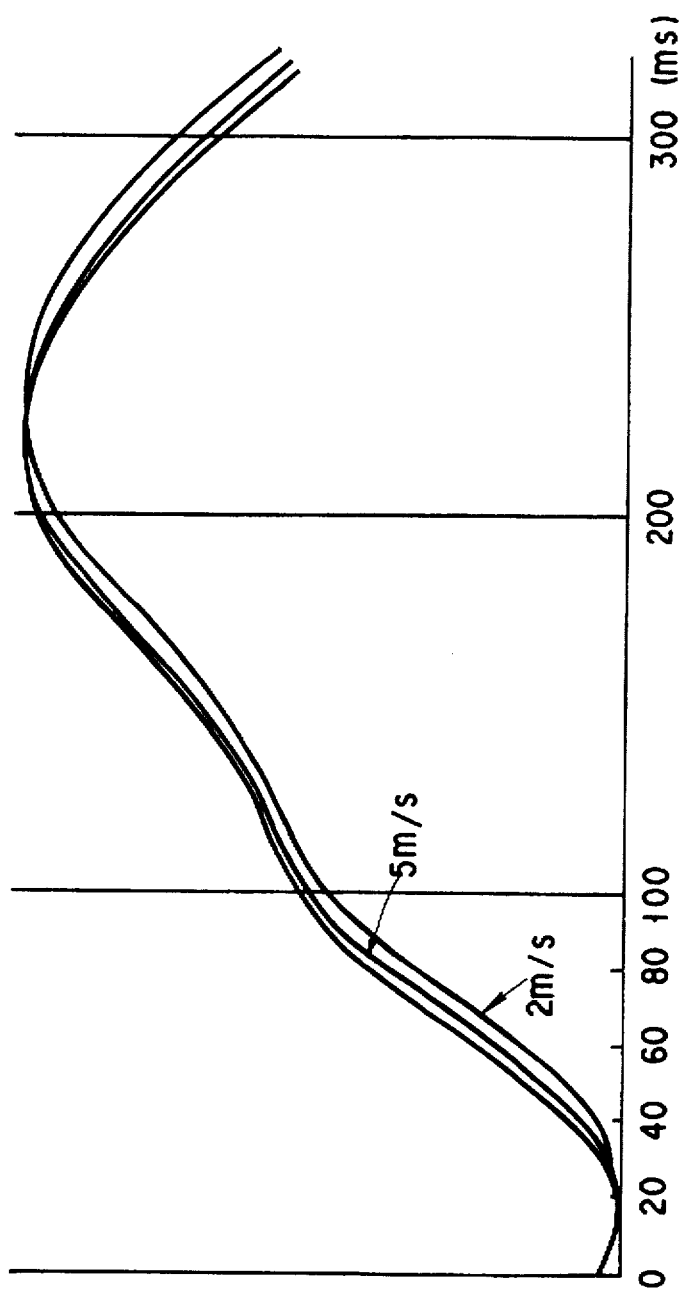
FIG. 22 is a view showing one example of function data of the blood vessel, which is prepared based on the tracks of FIG. 21 by the image processor of FIG. 1.

On the B-mode image, two lines of interest M, M', which are separated to a certain extent, are designated to cross the blood vessel 53. The upper and lower ends of the blood vessel 53 are designated on two lines of interest. Then, each path is obtained from four start points P1, P2, P1' and P2 '. FIG. 21 shows an example in which four paths (tracks) are simultaneously displayed. In FIG. 22, a change in a time series of the distance (diameter of the blood vessel) between a pair of two paths, that is, (P1–P2) and (P1'–P2'), is enlarged to be displayed.

The expansion phenomenon of the blood vessel due to the propagation of the pulse wave appears on, for example, the line of interest M, and on the line of interest M' a little later. This delay is time, which is required to propagate the pulse wave from M to M' or from M' to M. Then, an actual distance between M and M' is divided by delay time, so that the propagation velocity of the pulse wave can be obtained.

The expansion phenomenon can be recognized based on a cross-correlation relationship. The cross-correlation relationship shows degree of approximation between M and M' in the time wave (time change) of the diameter of the blood vessel. Namely the time when the relationship is most is the propagation time. In the simplified method, the propagation time is obtained a difference between two paths. In other words, the phase time position (time difference) of time wave between two diameters is shifted little by little to obtain a sum of the square of the difference between two waves. Then, an amount of shift (time difference) in which the sum is minimized is obtained as propagation time. Then, the distance between M and M' is divided by the propagation time so as to calculate the propagation velocity of the pulse wave. In this case, the change of velocity in a time series may be used in place of the displacement. Also, the number of lines of interests may be three or more in place of two lines of interest.

It is assumed that delay time is $\Delta t$ and the propagation velocity of the pulse wave is Vp, and the distance between M and M' is L. The following equation can be given.

$$L = Vp \cdot \Delta t \qquad (4)$$

Based on the measured $\Delta t$ and L, the propagation velocity of the pulse wave Vp can be obtained in accordance with equation (4).

For example, if L=10 mm and Vp=2 m/sec, $\Delta t$=5 ms. If two lines of interest are set, the value of L can be obtained by multiplying the number of pixels sandwiched between two lines of interest by a pixel pitch. The calculations of equations (1) to (4) can be easily executed by the image processor 19B.

Figure 23:
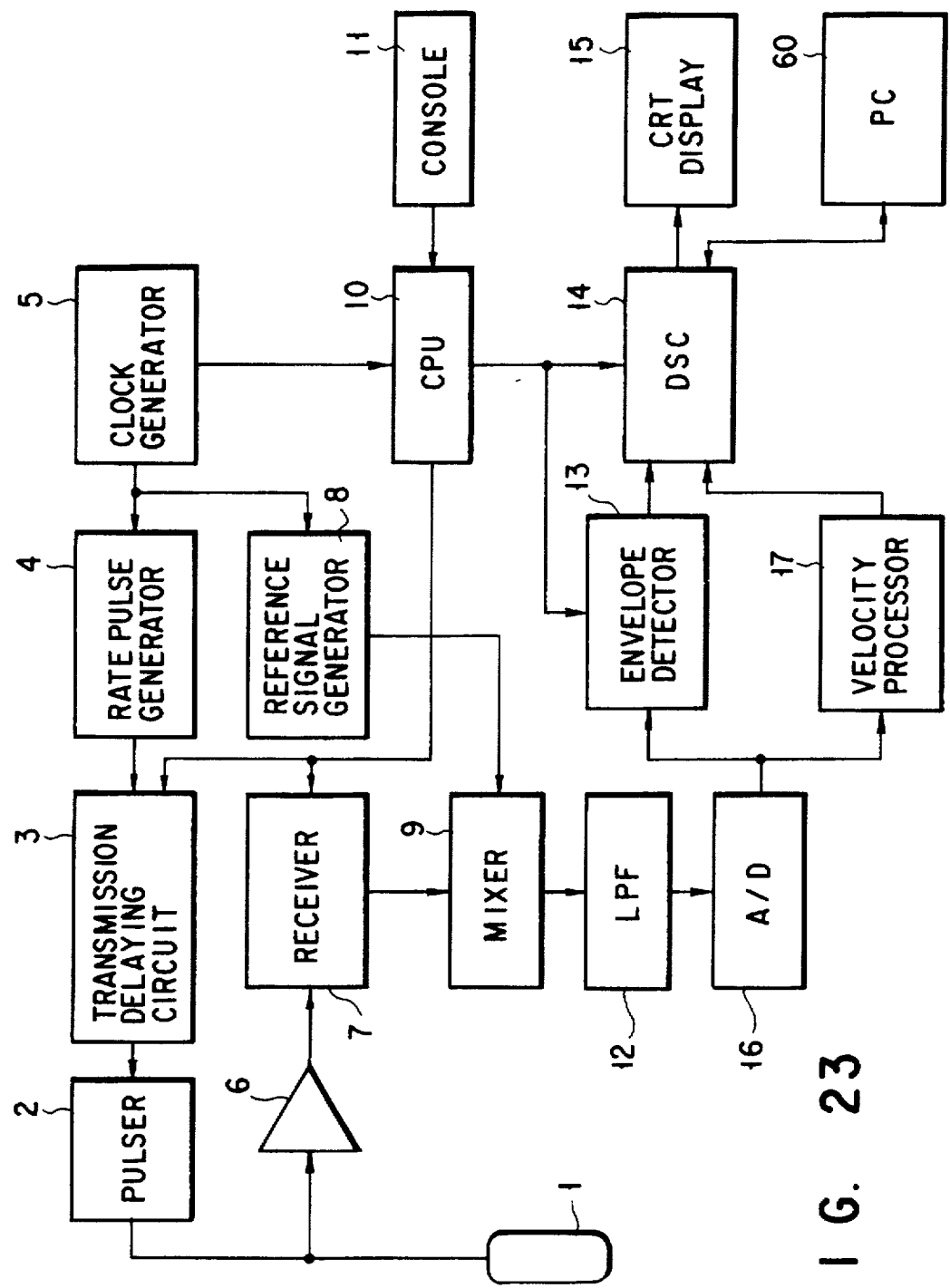
FIG. 23 is a block diagram of a modification of the present invention.

As shown in FIG. 23, the processing of the path of the track and its application may be executed by a personal computer (PC) 60 having the functions of the memory 18A of FIG. 1, the tracking processor 19A, the overlay memory 18B and the image processor 19B, separately from the ultrasound diagnostic apparatus. In other words, as the function of the console 11, only data output from DSC 14 may be sent to PC 60. Or, only the result processed by PC 60 may be changed to be displayed on the CRT display 15. The other operations may be executed by PC 60. In this case, PC 60 may be, of course, contained in the same housing. Also, PC 60 may be used in common to CPU 10. As a result, the technical advantage of the present invention can be realized without changing the hardware of the main body, and this is greatly useful in view of the practical use. The feature of using PC 60 lies in the point that the sufficient analysis can be executed based on not only internal special data of the ultrasound diagnostic apparatus but also data finally output from DSC 14.

The invention in its broader aspect is not limited to the specific details and representative devices shown and described herein. Accordingly, various modifications may be made without departing from the spirit or scope of the general inventive concept as defined by the appended claims and their equivalents.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

What is claimed is:

1. An ultrasound diagnostic apparatus comprising:
   means for repeatedly transmitting and receiving an ultrasound beam to and from an object of interest to repeatedly obtain an echo signal;
   velocity calculating means for calculating a motion velocity for each time phase of a plurality of portions of said object on said ultrasound beam based on said echo signal;
   tracking means based on said velocity for tracking a position of at least one specific portion of said plurality of portions as that position changes with the passage of time to obtain a path showing the movement over time of the position of said specific portion; and
   display means for displaying said path or said position of the specific portion after movement.

2. The apparatus according to claim 1, wherein said tracking means comprises means for multiplying the velocity of said specific portion by a predetermined amount of time to calculate a motion distance where said specific portion has moved for said predetermined amount of time, and said tracking means comprises means for adding or subtracting said motion distance to or from the position of said specific portion to calculate the position of said specific portion after said predetermined amount of time.

3. The apparatus according to claim 2, wherein said predetermined amount of time is an integer multiple of time or an inverse of an integer corresponding to a pixel pitch of said display means.

4. The apparatus according to claim 1, further comprising means for designating said specific portion.

5. The apparatus according to claim 1, further comprising:
   means for designating a time range in which said specific portion is tracked.

6. The apparatus according to claim 5, wherein said specific portion or said time range is designated on an M-mode image.

7. The apparatus according to claim 1, further comprising means for averaging a plurality of paths of said specified portion obtained at a different time by said tracking means.

8. The apparatus according to claim 7, wherein each of said paths can be obtained from the duration of a heart beat cycle.

9. The apparatus according to claim 1, wherein said display means overlays said path on an M-mode image of said subject to be displayed with color.

10. The apparatus according to claim 1, further comprising means for displaying at least one value of a velocity, a strain, acceleration, a density of the echo signal, and a distance or the velocity difference between a plurality of positions, corresponding to the path, by a numeric value or a graph, together with the path.

11. The apparatus according to claim 10, wherein said displaying means displays the path and the value at the same time on a same time-scale.

12. The apparatus according to claim 1, further comprising means for calculating a distance between two paths obtained by said tracking means.

13. The apparatus according to claim 12, further comprising means for calculating a blood pressure at every time phase based on a change of a diameter of a blood vessel in a time series, the highest blood pressure, and the lowest blood pressures when said change in said distance shows the change in the diameter of the blood vessel.

14. The apparatus according to claim 1, further comprising means for calculating a pulse wave propagation velocity of a blood vessel based on a path of an upper stream portion of the blood vessel of said object and a path of a lower stream portion, each obtained by said tracking means.

15. The apparatus according to claim 1, wherein said display means displays said tracks with brightness or color in accordance with density of said echo signal.

16. The apparatus according to claim 1, wherein said display means overlays a plurality of tracks, each having a different direction of said ultrasound beam obtained by said tracking means, to be displayed.

17. The apparatus according to claim 1, further comprising filter means for attenuating a low velocity component.

18. The apparatus according to claim 17, wherein a sampling cycle of said filter means has an interval having an integer multiple of 2 (twice) or more as large as a repeat cycle of receiving and transmitting of said ultrasound beam.

19. The apparatus according to claim 17, wherein the sampling cycle of said filter means is an integer multiple of a frame cycle required to scan a cross section of said object.

20. The apparatus according to claim 17, wherein the sampling cycle of said filter is different from that of said velocity calculating means.

21. The apparatus according to claim 1, further comprising preparation means for preparing a third track from a first path tracked along a forward direction of a second path tracked along an opposite direction to the time passage.

22. The apparatus according to claim 21, wherein said preparation means prepares said third path at a portion where the positions of said first and second paths conform to each other.

23. An ultrasound diagnostic apparatus comprising:

means for repeatedly transmitting and receiving an ultrasound beam to and from an object to repetedly obtain and echo signal.

velocity calculating means for calculating a motion velocity for a plurality of portions in a cross section of the object based on said echo signal;

tracking means based on said velocity for tracking said plurality of portions as those positions change with the passage of time to obtain paths showing the movement over time of the positions of said portions; and means for calculating motion distances of portions on at least one beam in the cross section based on the paths obtained by said tracking means to obtain a spatial distribution of the motion distances or positions after movement.

24. The apparatus according to claim 23, wherein said spatial distribution of each motion distance or position is displayed to be overlapped with the B-mode image by color.

25. The apparatus according to claim 1 or 23, wherein said motion distance or position is a distance or position after the object has changed shape.

26. The apparatus according to claim 23, wherein the change in time of one or two-dimensional spatial distribution of said motion distance or position is displayed by use of the image.

27. The apparatus according to claim 1, further comprising means for connecting points of the same distance on the paths, obtained by said tracking means, by a contour line to generate a contour map.

28. The apparatus according to claim 27, wherein said display means displays said contour line by color in accordance with said distance.

29. The apparatus according to claim 28, wherein said display means displays a contour line corresponding to a distance longer than a predetermined distance by red on the one hand, and a contour line corresponding to a distance shorter than the predetermined distance by blue on the other hand.

30. The apparatus according to claim 1, wherein said display means displays the B-mode image where the live scanning or the specific portion is displayed including said specific portion on the same screen as the screen on which said path is displayed.

31. An image processing apparatus for processing an ultrasound image, having an echo data and velocity data corresponding to a position of the echo data for each of a plurality of portions of an object, comprising:

tracking means based on said change of the velocity in a time series for tracking a position of at least one specific portion of said plurality of portions as that position changes with the passage of time to obtain a path showing the movement over time of the position of said specific portion; and display means for displaying said path or the specific portion after the movement.

* * * * *

UNITED STATES PATENT AND TRADEMARK OFFICE
CERTIFICATE OF CORRECTION

PATENT NO. : 5,785,654
DATED : July 28, 1998
INVENTOR(S) : Kazuhiro IINUMA et al.

It is certified that error appears in the above-indentified patent and that said Letters Patent is hereby corrected as shown below:

Title page, Item [57], in the Abstract, line 6, after "tracked", delete "in"; and line 8, after "Conventionally", insert --,--.

Claim 13, col. 14, line 50, "pressures" should read --pressure,--.

Claim 23, col. 15, line 19, "repetedly" should read --repeatedly--.

Claim 23, col. 15, line 20, "and echo signal." should read --an echo signal;--.

Signed and Sealed this

Twenty-ninth Day of June, 1999

Attest:

Q. TODD DICKINSON

*Attesting Officer*     *Acting Commissioner of Patents and Trademarks*